Nov. 10, 1959   W. H. LEWIS   2,912,232
PAVEMENT CUTTING DEVICE WITH FRONT AND REAR CUTTER DISCS
Filed April 3, 1956   2 Sheets-Sheet 1
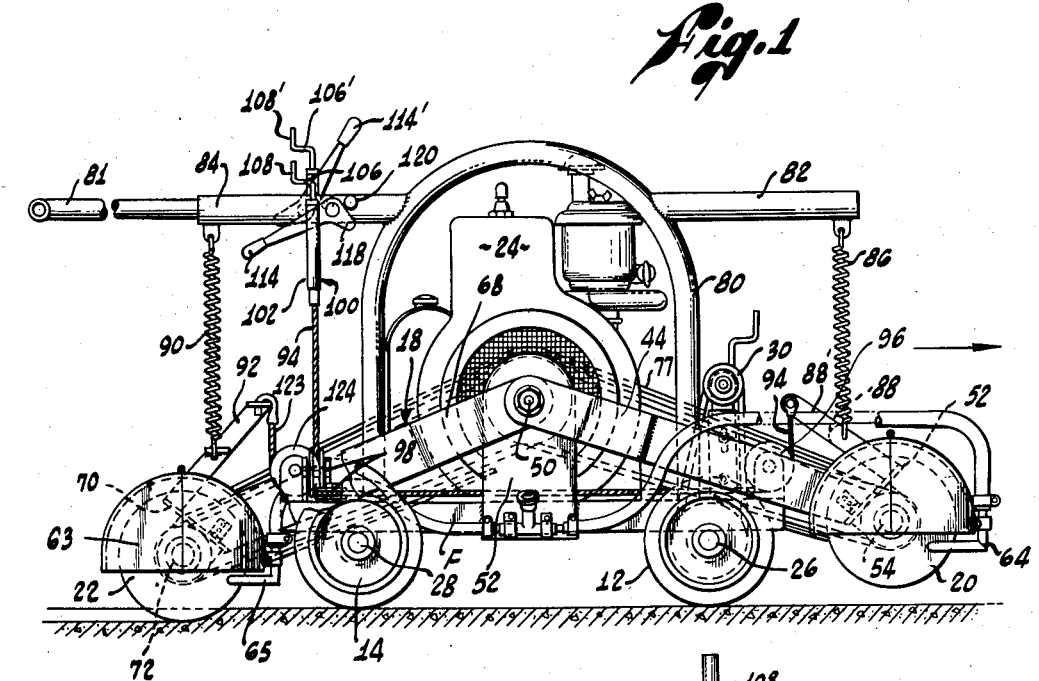
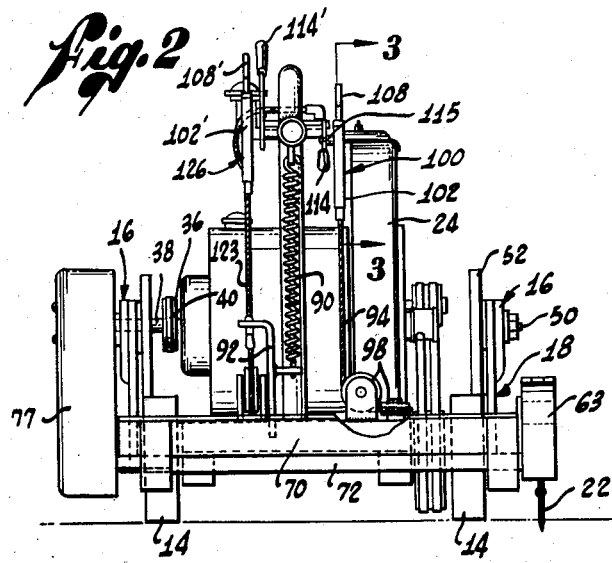
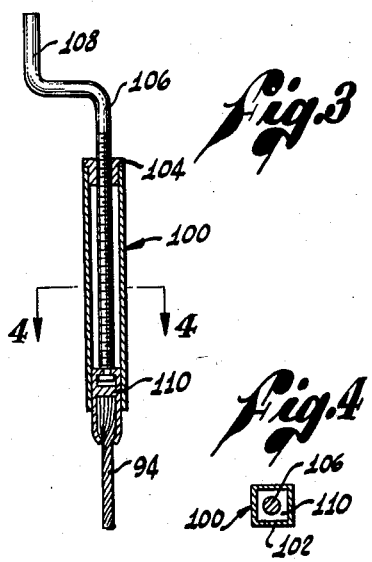
INVENTOR.
WILLIAM H. LEWIS
ATTORNEYS

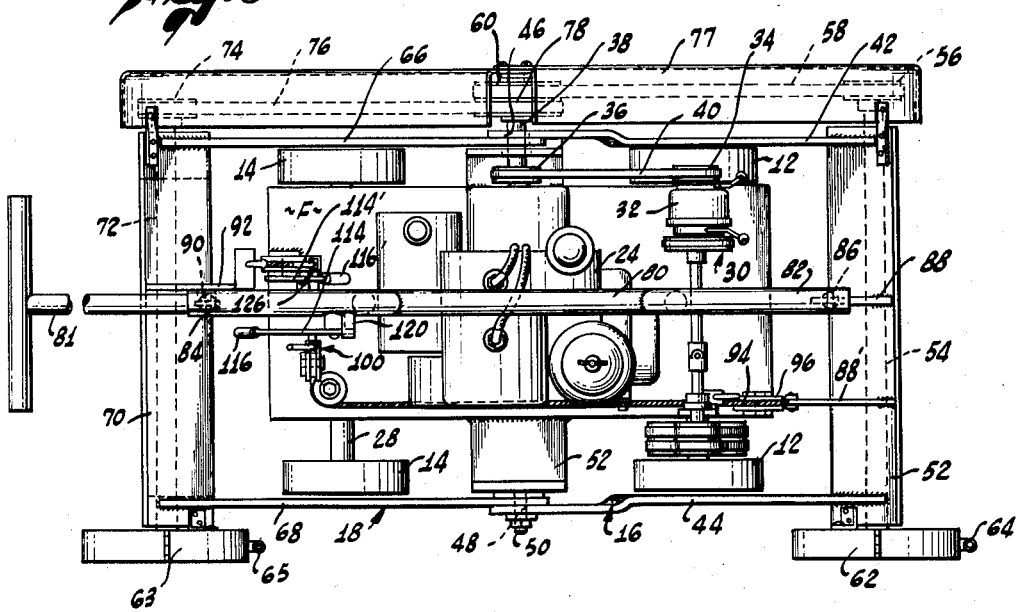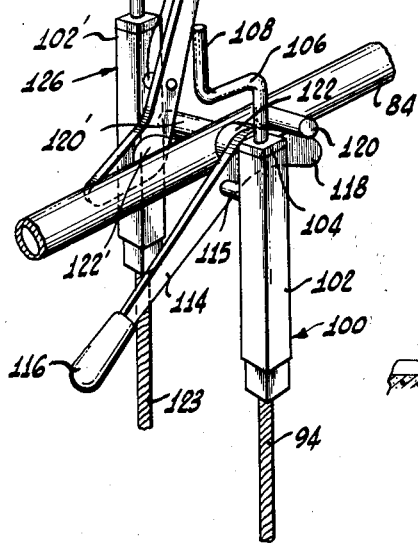

United States Patent Office 2,912,232
Patented Nov. 10, 1959

2,912,232

PAVEMENT CUTTING DEVICE WITH FRONT AND REAR CUTTER DISCS

William H. Lewis, Arcadia, Calif., assignor to Cutcrete Manufacturing Corp., El Monte, Calif., a corporation of California Application April 3, 1956, Serial No. 575,825

3 Claims. (Cl. 262—20)

The present invention relates generally to pavement cutting devices and more particularly to an improved device for cutting grooves or kerfs in pavement materials, such as concrete, asphalt and the like.

There have been heretofore-proposed pavement cutting devices adapted to cut elongated grooves or kerfs in the surface of paved slabs, such as roads, driveways, airport landing strips and the like. Generally, such heretofore-proposed devices broadly comprise a wheeled frame whereon is rotatably mounted a single power driven cutter disc, which cutter disc cuts a downwardly extending groove or kerf in the pavement as the frame is moved thereacross. The frame may be hand-pushed or alternately power-driven. Examples of such devices are shown in United States Letters Patent No. 2,468,336, No. 2,569,682 and No. 2,700,256 issued to me April 29, 1949, October 2, 1951 and January 25, 1955, respectively.

In these heretofore-proposed pavement cutting devices, the single power driven cutter disc is generally located at one side of the frame and either forwardly of this frame or rearwardly thereof. Where the heretofore-proposed devices are employed to cut a groove transversely of a paved strip having vertical obstructions along its sides (such as curbs), considerable time and effort on the part of the workman is required. Thus, where the cutter disc is located forwardly of the frame, the groove must be started some distance away from the edge of the curb. The device is then pushed forwardly to the opposite side of the strip. Thereafter, it is necessary for the operator to return the device to the original side of the strip and align the cutter disc with the groove in order to complete the cut. If this groove must be formed parallel to a vertical obstruction, it is also necessary that the blade be shifted from one side of the device to the other and the direction of movement of the machine reversed before the groove may be completed. If the single cutter is located rearwardly of the frame and a curb exists at both sides of the strip to be cut, it will not be possible for the operator to complete the cut in a single pass. Instead, after cutting as close as possible to the far curb, it will be necessary for him to turn the machine around and align the cutter disc with the groove and then move the device backwards in order to complete the cut.

It is a major object of the present invention to provide an improved device for cutting grooves in a paved surface.

It is another object of the invention to provide a pavement cutting device with which a complete transverse cut may be made in a paved strip in a single pass.

A further object is to provide a pavement cutting device of the aforedescribed nature which incorporates front and rear longitudinally aligned cutter discs that are selectively engageable with the paved surface to be cut.

Yet another object of the invention is to provide a pavement cutting device of the aforedescribed nature which is adapted to be power-driven across the surface of the pavement to be cut.

An additional object is to provide a pavement cutting device of the aforedescribed nature which is simple of design and rugged of construction whereby it may afford a long and trouble-free service life.

Another object of the invention is to provide a pavement cutting device of the aforedescribed nature which does not require the services of a skilled operator.

Yet a further object of the invention is to provide a pavement cutting device of the aforedescribed nature incorporating means for accurately achieving the desired depth of cut.

These and other objects of the present invention will become apparent from the following detailed description when taken in conjunction with the appended drawings, wherein:

Figure 1 is a side elevational view of a preferred form of pavement cutting device embodying the present invention;

Figure 2 is a rear view of said pavement cutting device;

Figure 3 is an enlarged vertical sectional view taken along lines 3—3 of Figure 2;

Figure 4 is a horizontal sectional view taken on lines 4—4 of Figure 3;

Figure 5 is a top plan view of said pavement cutting device;

Figure 6 is a fragmentary perspective view of a detail thereof; and

Figure 7 is a reduced diagrammatic view showing the mode of operation of said device.

Referring to the drawings, the preferred form of pavement cutting device embodying the present invention includes a main frame F supported for movement across a slab of concrete 10 by front wheels 12 and rear wheels 14. Secured to the frame F are a front support 16 and a rear support 18. The front support 16 carries a rotatable front cutter disc 20 while the rear support 18 carries a rotatable rear cutter disc 22. These cutter discs are longitudinally aligned. Power-operated means in the form of an air-cooled internal combustion engine 24 serves to effect rotation of the front wheels 12 as well as the rotation of the cutter discs 20 and 22 whereby the frame F may be moved across the surface of the pavement 22. Interposed between the frame F and the front and rear supports 16 and 18 are means to be fully described hereinafter for controlling the elevation of the cutter discs 20 and 22 relative to the frame. With this arrangement, either or both of these cutter discs may be engaged with the pavement 10 so as to form a downwardly extending groove or kerf therein as the frame F is caused to move thereacross.

More particularly, the frame F may be substantially rectangular in plan form. The front wheels 12 are driven by the engine 24 through a suitable speed-varying mechanism designated 30. The speed-varying mechanism includes a pulley 34 which is connected to a similar pulley 36 keyed to the drive shaft 38 of the engine 24 by a belt 40.

The front support 16 includes a pair of longitudinally extending, aligned pivot arms 42 and 44 having their rear ends pivotally secured to the mid-portion of the frame F at a point coinciding with the longitudinal axis of the engine drive shaft 38. Thus, the rear end of the pivot arm 42 is formed with a bore 46 that receives the drive shaft 38, while the rear end of the pivot arm 44 is formed with a bore 48 that pivotally receives a spindle 50. The spindle 50 is rigidly carried by a support 52 affixed to the frame F. The front end of the pivot arms 42 and 44 are rigidly secured as by welding to a transverse cross-piece 52. The cross-piece 52 journals a shaft 54 having one of its ends keyed to the front cutter disc 20 and its opposite end keyed to a pulley 56. The pulley 56 is connected by a belt 58 to a complementary pulley 60 keyed to the engine drive shaft 38. In this manner, the front cutter disc 20 is rotated by the engine 24. The cross-brace 52 also carries a hinged guard 62 for the front cutter disc 20. The front end of this guard 62 is affixed to a coolant head 64 for supplying coolant to the front cutter disc. The rear support 18 is similar in construction to the aforedescribed front support 16. Thus, it includes a pair of pivot arms 66 and 68 having their front ends pivotally carried by the engine drive shaft 38 and the spindle 50, respectively. The rear end of these pivot arms are rigidly affixed to a transverse cross-piece 70 which journals a shaft 72. One end of the shaft 72 is keyed to the rear cutter disc 22 while the opposite end thereof is keyed to a pulley 74. The pulley 74 is connected by a belt 76 to a complementary pulley 78 keyed to the engine drive shaft 38. A suitable guard 77 is provided for the various pulleys and belts 58 and 76. A hinged guard 63 and coolant head 65 similar to those designated 62 and 64 hereinabove are carried by the rear cross-piece 70.

A vertically extending, generally C-shaped superstructure 80 is secured to the center of the frame F. This superstructure 80 is of tubular cross-section having its front end rigidly affixed to the front portion of the frame and its rear end rigidly secured to the rear portion of the frame. A tubular front spring retainer 82 extends forwardly from the upper front portion of the superstructure 80, the rear portion of this retainer being rigidly affixed as by welding to the support. A similar rear spring retainer 84 extends rearwardly from the upper rear portion of the support 80. A handle bar 81 is telescopically anchored within the rear spring retainer 84. The front end of the front spring retainer 82 is connected to the upper end of a tension spring 86. The lower end of this tension spring 86 is affixed to an anchoring post 88 having its front end rigidly secured as by welding to the front cross-piece 52. Likewise, the rear end of the rear spring retainer 84 is connected to the upper end of a second tension spring 90. The lower end of this tension spring 90 is affixed to the intermediate portion of an anchoring post 92. The rear end of the latter is rigidly secured as by welding to the rear cross-piece 70. The rear end of the front anchoring post 88 is connected to a cable 94. This cable 94 passes downwardly from its point of connection to the anchoring post 88 over a pulley 96 journaled by the front portion of the frame F. From the pulley 96 the cable 94 extends rearwardly over a pair of direction-reversing pulleys 98 carried by the rear portion of the frame. From the latter pulleys the cable 94 extends upwardly to the lower end of an elevation control mechanism 100.

With particular reference to Figures 3 and 6, the elevation control mechanism 100 includes a tube 102 formed at its upper end with a nut element 104. The nut element 104 threadably receives the threaded portion of a crank rod 106 having an actuating handle 108. The lower end of the crank rod 106 rotatably carries an anchor element 110 which is secured to the upper end of the cable 94. The upper portion of the tube 102 is pivotally affixed to the intermediate portion of a toggle arm 114 by a pin 115. A manually engageable hand grip 116 is formed on one end of the toggle arm 114. The opposite end of this toggle arm is formed with a lock finger 118 which is engageable with a stop element 120 rigidly extending from one side of the rear spring retainer 84. The toggle arm 114 is pivotally affixed to the rear spring retainer 84 at a point between the lock finger 118 and the pin 115 by a short shaft 122. Referring again to Figures 1 and 2, the front end of the rear anchoring post 92 is affixed to a second cable 123. This cable 123 extends downwardly from its point of connection to the rear anchoring post 92 over a pulley 124 supported by the rear portion of the frame F. From the pulley 124 the cable 123 extends upwardly to a second elevation control mechanism 126 that is identical to the elevation control mechanism 100 described hereinabove. In the drawings, the parts of this second elevation control mechanism 126 are identified by primed reference numerals similar to those employed in conjunction with the foregoing description of the elevation control means 100.

In the operation of the aforedescribed device, it is first moved to the location where a groove is to be formed. Referring to Figure 1, assuming that the groove is to be formed from left to right relative to the pavement 10, the rear cutter disc 22 will be lowered into its position of this figure. At this time, the front cutter disc 20 will be maintained in its raised position of this figure. In order to retain the cutter discs in such positions, the toggle arms 114 and 114' of the elevation control mechanisms 100 and 126 will be arranged as shown in Figures 1, 2, 5 and 6. Under these conditions, the front spring 86 will serve to support the weight of the front support 16 and its attached parts. The rear cutter disc 22 will be maintained in its lowered position by the cable 123, the latter being stretched taut by the elevation control mechanism 126. The depth of the groove formed by the rear cutter disc 22 may be varied by rotation of the crank rod 106. Preferably, the engine 24 will be in operation and coolant will be caused to flow through the rear coolant head 65 before the rear cutter disc 22 is lowered to its position of Figure 1. With the parts of the device arranged as shown in Figure 1, the speed varying mechanism 30 will be so adjusted as to cause the front wheels to rotate at the rate of speed necessary to obtain the desired rate of travel of the device across the pavement. The handle bar 81 may be employed to steer the device in a straight line.

Referring now to Figure 7, as the device nears the edge of the pavement wherein the groove is being formed, the front cutter disc 20 will also be lowered. This is readily accomplished by effecting clockwise rotation of the toggle arm 114 relative to its position shown in Figures 1, 2, 5 and 6. Such clockwise rotation will serve to lift the tube 102 and hence draw the cable 94 taut. As the rear portion of the cable 94 is raised, its front portion will be lowered so as to thereby effect clockwise pivotal movement of the front support 16. In this manner, the front cutter disc 20 will be pulled downwardly into the pavement 10. Once the toggle arm 104 has been rotated to a position similar to that of toggle arm 114', its intermediate portion will abut the upper end of the stop element 120. The force of the spring 86 will serve to positively maintain the toggle arm in this position. After the front cutter disc 20 has been lowered into the pavement 10, the device will be allowed to continue its forward movement until the cut has been completed. It should be noted that it is not necessary to stop the forward movement of the device in order to lower the front cutter disc 20. Accordingly, a groove may be formed across the pavement 10 in a minimum amount of time and with a minimum expenditure of labor.

While there has been shown and described hereinbefore what is presently believed to be the preferred form of pavement cutting device embodying the present invention, it will be apparent that various modifications and changes may be made thereto without departing from the spirit of the invention or the scope of the following claims.

I claim:
1. A pavement cutting device for use in cutting a groove across a paved surface that is bounded on at least one side by a vertical abutment, comprising: a frame; wheel means on said frame whereby it may be moved forwardly across said pavement towards or away from said vertical abutment; a front cutter disc; a rear cutter disc longitudinally aligned with said front cutter disc; a front support secured to said frame for vertical movement relative thereto, said front support extending forwardly of said frame and rotatably carrying said front cutter disc; a rear support secured to said frame for vertical movement relative thereto, said rear support extending rearwardly of said frame and rotatably carrying said rear cutter disc; and elevation control means interposed between said frame and said front and rear supports to independently raise one of said cutter discs and lower the other of said cutter discs relative to said pavement without interrupting the movement of said device across the pavement, said elevation control means including means for limiting the degree of downward movement of said front and rear supports whereby said cutter discs will assume a predetermined common cutting depth when disposed in their lower position.

2. A pavement cutting device for use in cutting a groove across a paved surface that is bounded on at least one side by a vertical abutment, comprising: a frame; wheel means on said frame whereby it may be moved forwardly across said pavement towards or away from said vertical abutment; a front cutter disc; a rear cutter disc longitudinally aligned with said front cutter disc; a front support pivotally secured to said frame for vertical movement relative thereto, said front support extending forwardly of said frame and rotatably carrying said front cutter disc; a rear support pivotally secured to said frame for vertical pivotal movement relative thereto, said rear support extending rearwardly of said frame and rotatably carrying said rear cutter disc; a flexible element interposed between said frame and said front support; a second flexible element interposed between said frame and said rear support; spring means interposed between said frame and said supports to normally bias said cutter discs toward a raised position relative to said pavement; and elevation control means on said frame for selectively exerting tension on said flexible means so as to independently lower either of said cutter discs into said pavement against the force of said spring means, with the newly-lowered cutter disc assuming the same cutting depth previously assumed by the newly-raised cutter disc.

3. A pavement cutting device as set forth in claim 2 wherein said elevation control means includes means for varying the length of said flexible elements so as to control the cutting depth of said cutter discs.

References Cited in the file of this patent

UNITED STATES PATENTS

| | | |
|---|---|---|
| 909,059 | Card | Jan. 5, 1909 |
| 970,583 | Warner | Sept. 20, 1910 |
| 1,302,917 | Hairgrove | May 6, 1919 |
| 2,364,879 | Talboys | Dec. 12, 1944 |
| 2,502,043 | Howard | Mar. 28, 1950 |
| 2,624,129 | Steece | Jan. 6, 1953 |
| 2,700,256 | Lewis | Jan. 25, 1955 |
| 2,716,402 | Harrison et al. | Aug. 30, 1955 |
| 2,791,412 | Hatcher | May 7, 1957 |